United States Patent [19]
Hiemer et al.

[11] 3,830,429
[45] Aug. 20, 1974

[54] METERING OR INJECTION ELEMENT

[75] Inventors: Armin Alexander Hiemer, Unterreitnau; Ludwig Jakob Hippel, Lindau, both of Germany

[73] Assignee: The Upjohn Company, Kalamazoo, Mich.

[22] Filed: May 31, 1973

[21] Appl. No.: 365,603

[30] Foreign Application Priority Data
Dec. 21, 1972 Germany.......................... 2262730

[52] U.S. Cl.................... 239/88, 239/125, 239/584
[51] Int. Cl......................... F02m 47/02, B05b 1/30
[58] Field of Search........... 239/88, 90, 91, 99, 125, 239/124, 583, 584

[56] References Cited
UNITED STATES PATENTS
3,469,793 9/1969 Guertler........................... 239/90 X
3,589,610 6/1971 Wahlin et al....................... 239/125

FOREIGN PATENTS OR APPLICATIONS
723,715 8/1942 Germany............................ 239/88

Primary Examiner—Robert S. Ward, Jr.
Attorney, Agent, or Firm—Steward & Steward

[57] ABSTRACT

The present invention relates to an injection or three-way metering element for plastic molding machines and the like, comprising an injection nozzle, which opens into a mixing chamber or the like, and comprising a return flow port which returns the supplied material flow in circulation in the case of an interruption of the injection process, and a control element for the switchover of the material flow from the injection step to the return step and vice versa, and a return valve and an injection valve each having identical or analogous characteristics of their flow and opening cross-sections at any degree of opening thereof, and each being adapted to be operated by said control element simultaneously and in opposite directions, wherein said control element and said return and injection valves, particularly the valve plungers thereof, are each of hollow construction and with the inner spaces or cavities defined thereby forming said return flow port through which the return of the material flow is effected.

8 Claims, 5 Drawing Figures

METERING OR INJECTION ELEMENT

The present invention relates to an injection or three-way metering element for plastic molding machines and the like, comprising an injection nozzle, which opens into a mixing chamber or the like, and comprising a return flow port which returns the supplied material flow in circulation in the case of an interruption of the injection process, and a control element for the switchover of the material flow from the injection step to the return step and vice versa, and a return valve and an injection valve each having identical or analogous characteristics of their flow and opening cross-sections at any degree of opening thereof, and each being adapted to be operated by said control element simultaneously and in opposite directions.

In the metering or injection of individual liquid components of plastic materials, e.g., of the raw materials and additives of polyurethane, into a mixing chamber wherein an intimate mixing of the components is effected, it is prior condition that the components are introduced into the mixing chamber absolutely simultaneously, i.e., without any lead or lag. Otherwise, the product obtained may become imperfect. Accordingly, it is the object of the present invention to provide a metering or injection valve which is of improved construction especially with respect to the flow of the material through the valve.

A further object is to provide an injection element wherein said control element and said return and injection valves, particularly the valve plungers thereof, are each of hollow construction and with the inner spaces or cavities defined thereby forming said return flow port through which the return of the material flow is effected.

This injection element, thus, provides the advantage of an improvement in flow-line technics, because the material flow through the valve proper is provided with a very small number of deflections.

Another object is to provide an injection element wherein said control element formed by a piston and said return and injection valves comprise a multi-part or a substantially integral, approximately spindle-shaped and axially movable hollow body which is provided with an inner bore forming said return flow port.

Accordingly, it is of advantage if the inner bore, on the one hand, communicates with a material inlet port through one or more radial ports, and, on the other hand, has an axial front-side port which forms the controllable valve orifice of the return valve. However, as an alternative, it may be expedient if the central inner bore in the region of the ends of the two valve plungers is provided with at least one radial port each, whereby the front faces of the two valve plungers are each of identical construction and co-operate with the associated valve seats of the return valve and of the injection valve.

A further object is to provide an injection element wherein an adjustment cone is provided which is axially movable for metering purposes, which adjustment cone is positioned opposite said valve port in the end face of said return valve and cooperates with said port.

A further object is to provide an injection element wherein the end of said plunger of said return valve which has said return valve port therein, comprises an insert element being releasably connected to said approximately spindle-shaped hollow body by means of a threaded connection. The injection valve may have a replaceable nozzle, too.

The injection element or the metering valve according to the invention may be used both in low-pressure systems and in medium-pressure and high-pressure systems.

These and other objects will be apparent from the drawing and the following description. Referring to the drawing.

The first embodiments according to the invention, by means of which the invention is explained in greater detail below, may be connected into a material circuit which includes a pump for the circulation of the liquid material, a reservoir for receiving the liquid material as well as a supply conduit and a return conduit, whereby the cross-sectional flow area of the return conduit is of maximum dimension in order to keep flow resistance to a minimum.

Figure 1:
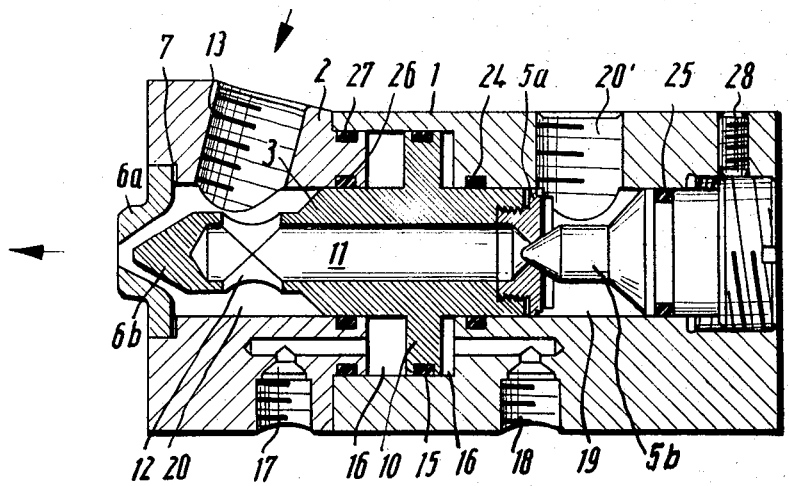
FIG. 1 is a longitudinal section through a first preferred embodiment of the valve according to the invention, wherein the open position of the injection valve and the closed position of the return valve are shown.
Figure 2:
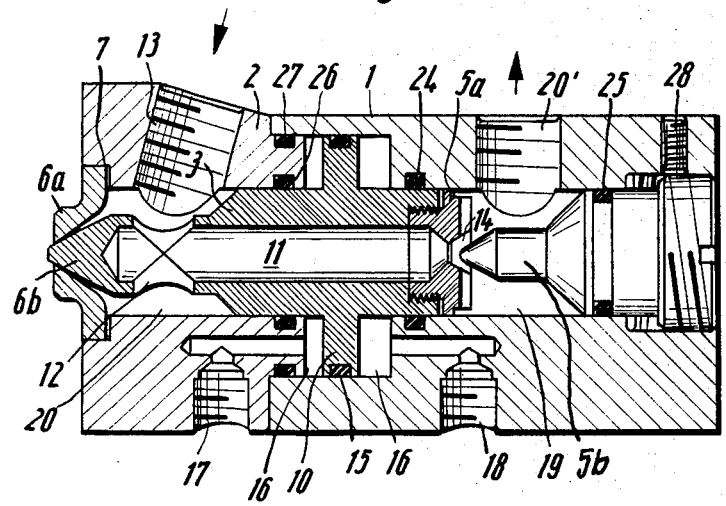
FIG. 2 is another longitudinal section through the valve according to FIG. 1, wherein, however, the closed position of the injection valve and the open position of the return valve are shown.

The metering valve shown in FIGS. 1 and 2 includes a valve housing 1 which at one end face thereof is connected to a housing cover 2 and thereby sealed by means of an annular seal or gasket 27 which may consist, for example, of an O-ring. Interiorly of the housing 1 and of the cover 2, there is provided an e.g., integrally formed hollow body 3 adapted to be moved between two positions, which body has an approximately spindle-shaped or spool-shaped configuration and which, owing to its hollow construction, is provided with an inner bore forming a return flow passage 11. The hollow body is provided on the outer periphery thereof with an annular flange forming a piston which represents a control element 10 and which carries on the outer periphery thereof an O-ring 15 effecting a seal relative to a cylindrical operating chamber 16 formed interiorly of the housing 1 and connected to compressed air inlets 17 and 18 through passages formed in the housing 1 and in the housing cover, respectively. Thus, the control element 10 for the axial movement of the hollow body is formed by the piston which is subjected to the compressed air on both sides thereof and which is adapted to reciprocate between two positions in the operating chamber 16.

The housing 1 and the cover 2 are each provided with aligned inner bores 19 and 20, respectively. These two inner bores 19 and 20 receive the two ends of the approximately spindle-shaped hollow body 3 which form the two valve plungers, and O-rings 24 and 26 are provided to effect sealing relative to the cylindrical operating chamber 16.

The housing cover 2 is provided with a material inlet port 13 which is connected to the abovementioned supply conduit, while the abovementioned return conduit is connected to a return port 20' provided in the housing 1.

The end 6b — at the left hand side according to the drawing — of the one valve plunger and an interchangeable nozzle 6a cooperating with said end form an injection valve opening into a not illustrated mixing chamber. Nozzle 6a is sealed relative to the housing cover 2 means by an annular seal 7.

The end of the opposite valve plunger is formed by an insert 5a threaded into the hollow body 3 and including a central passageway which forms a controllable valve port 14 of the return valve comprising the insert 5a and a co-operating adjustment cone 5b. Adjustment cone 5b may be adjusted in axial direction by means of a threaded member, in accordance with the desired dimension of the passageway cross-section of the return valve which is defined by the annular gap between the front end of the adjustment cone 5b and the central passageway 14 of the insert 5a. In order to avoid unintentional variation of a once established position of the adjustment cone 5b, a set screw 28 is provided which engages into the threaded connection between the right hand end of the adjustment cone and the housing 1. Further, an O-ring 25 is provided which seals the adjustment cone from atmosphere.

The return passage 11 formed by the interior space of the hollow body 3 is connected to the material inlet port 13 through a plurality of radial passageways 12.

The mode of function and operation of the metering valve described above is as follows:

If, as shown in FIG. 1, compressed air is introduced into the cylindrical operating chamber 16 via the port 17, the piston forming the control element 10 is acted upon at the left hand piston face thereof. Hereby, the integrally connected hollow body 3 is shifted to the right until the insert 5a abuts with its central opening 14 against the left hand end of the valve cone 5b which, at the same time, closes the return valve. Also simultaneously with this operation, the injection valve is opened by withdrawal to the right of the conically formed end of the other valve plunger from the orifice of the nozzle 6a side, so that liquid material will flow through the thus opened annular gap into the not illustrated mixing as a consequence of the fact that the return conduit is blocked because of the closed return valve.

If the end of the injection cycle is initiated by a not illustrated automatic or control means, compressed air is introduced into the operating chamber 16 by the other inlet port 18, such that the other — the right hand — piston face of the piston forming the control element 10 is subjected to the pressure and the hollow body 3 being integrally connected to said piston is moved toward the left against the stop or abutment. This stop is formed by the inner wall of the nozzle 6a against which the cone 6b abuts, thereby closing the injection valve. At the same time, the return valve is opened, and that in an absolutely analogous manner. This has the consequence that the material does not flow, as before, from the material inlet port 13 through the injection valve; rather, the liquid material flows from the material inlet port 13 through the radial passageways 12 into the interior space of the hollow body 3 which forms the return passage 11, and then via the return valve into the return port 20' and into the return conduit. From this point, the liquid material passes into the reservoir and into the pump from which it is then recycled through the metering valve. This circuit remains unchanged until the injection valve is opened again in response to the next control pulse.

Figure 3:
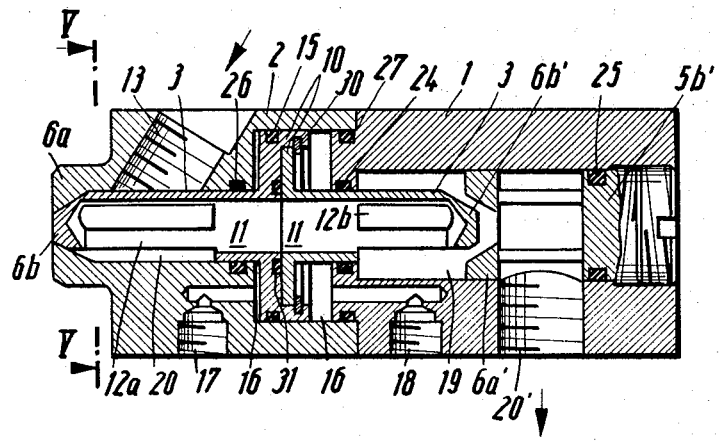
FIG. 3 is a longitudinal section through a second preferred embodiment of the valve according to the invention, wherein the closed position of the injection valve and the open position of the return valve are shown.
Figure 5:
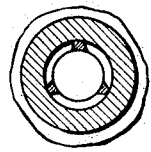
FIG. 5 is a sectional view along lines V—V of FIG. 3.
Figure 4:
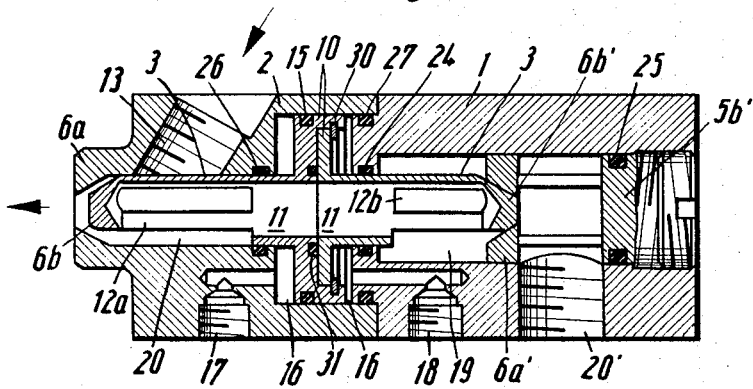
FIG. 4 is another longitudinal section through the valve according to FIG. 3, wherein, however, the open position of the injection valve and the closed position of the return valve are shown.

The second embodiment according to FIGS. 3 to 5 differs from the first embodiment according to FIGS. 1 and 2 in some details only; therefore, in order to avoid repetitions, the following description is directed to the different features only while, for the rest, the same reference numerals are used for identical parts.

The main difference between the second embodiment according to FIGS. 3 and 5 and the first one according to FIGS. 1 and 2 consists in that in the former case the return valve is of slightly modified construction, because the end of the right hand valve plunger is not provided with a central passageway in the end face; rather, it consists of a valve cone 6b' without any passageway and having exactly the same configuration as the oppositely positioned valve cone 6b of the injection valve. The valve cone 6b' cooperates with a correspondingly conically formed valve port or orifice 6a' which, likewise, has the same configuration as the valve nozzle 6a of the injection valve. The valve orifice 6a' of the return valve forms part of an axially movable slide member 5b' which corresponds to the adjustment cone 5b of the first embodiment according to FIGS. 1 and 2 and which is likewise screwed into the housing 1.

Instead of the radial passageways 12 according to FIGS. 1 and 2, in the embodiment of FIGS. 3 to 5 the valve plungers 3 are shaped triangularly at their ends (compare e.g., FIG. 5). In this way, there are formed three elongated openings each as passageways 12a and 12b which, as compared with the radial bores 12 of FIGS. 1 and 2, define a substantially greater aperture for the return flow which is essential to the function of the valves. Thus, the liquid material enters through the opening 12a into the interior space forming the return flow passage 11, and exits from this space through the opening 12b.

Another difference consists in that the approximately spindle-shaped or spool-shaped hollow body 3 is not of integral construction, but comprises a pair of similar parts which contact each other with their end faces in the region of the piston-shaped control element 10 and which are interconnected by means of a lock ring 30. Owing to the two-part construction of the body 3, an additional O-ring seal 31 is required which seals the return flow passage 11 relative to the operating chamber 16. Alternatively, the valve plunger may be of integral construction, too.

Finally, with respect to the injection valve, there is present the slight difference that the nozzle 6a is not releasably connected, but integrally connected to the housing cover 2. Besides, the housing cover 2 is extended slightly more to the right hand side than in the first embodiment according to FIGS. 1 and 2.

With the exception of the above discussed differences, no substantial differences exist between the embodiment according to FIGS. 3 to 5 and that according to FIGS. 1 and 2.

Summarizing, it can be seen that both embodiments of the metering valve according to FIGS. 1 to 5 show the advantage that an improvement is provided with respect to flow-line technics, because a substantially smooth and rectilinear flow through the metering valve is obtained owing to the axially movable hollow body.

Primarily, however, the embodiment according to FIGS. 3 to 5 in comparison with that according to FIGS. 1 and 2 shows the advantage and the difference that the control force which must be exerted by the pneumatically operated piston is less, namely during the closing of the injection valve or during the simultaneously effected opening of the return valve. That is, in the second embodiment the surface area of the approximately spindle-shaped hollow body 3 which is not balanced by a corresponding counter pressure is smaller, because it comprises a relatively small annular surface in the region of the valve seat of the return valve. As can be readily seen, this valve seat surface is smaller in the embodiment according to FIGS. 3 to 5 than in the first embodiment according to FIGS. 1 and 2. Accordingly, it has to be noted that this surface is substantially not pressure-balanced because the pressure of the return conduit exerted thereon is much smaller than the pressure provided by the feed pump which, in many cases of the plastic material processing, is in the range of from 4 to 6 atmospheres (with a maximum of 10 atmospheres).

If, as explained above, it is provided by suitably selecting the dimensions of the respective surface areas, that the control pressures for the switchover of the approximately spindle-shaped hollow body from the left to the right and vice versa are not of excessive magnitude, it is easy to produce the required control forces with the customary compressed air pressures of from 6 to 8 atmospheres which are each available in operation.

Instead of using compressed air for the reversing of the approximately spindle-shaped hollow body or of the two valves, respectively, naturally any desired hydraulic medium can be used at any suitable pressure, so that the question of the limitation of the maximum control pressure or of the maximum control force becomes meaningless, because a sufficiently high control pressure is available.

The above considerations similarly apply also to the opening of the injection valve or to the simultaneously proceeding closing operation of the return valve, respectively. Thus, generally it may be noted that the control forces may be kept the smaller, the more complete the pressure balance of the approximately spindle-shaped hollow body 3 is.

What we claim is:

1. In a plastic material injection machine or the like having a reservoir for a supply of fluid plastic material, an injection metering element for controlling the release of said material from said reservoir, pump and associated duct means for supplying said material to said injection element from said reservoir, and other duct means for returning excess material to said reservoir, the improvement in said injection metering element which comprises in combination, a housing defining an elongated plunger chamber, port means for communicating its opposite ends with said material feed and return ducts respectively, and injection and return valve means disposed at axially opposite ends of said plunger chamber;

a hollow plunger making a piston fit in said plunger chamber intermediate said feed and return ports to isolate them from free communication with each other, said plunger being formed at its opposite ends to provide valve means cooperating respectively with said injection and return valve means of said housing and being axially shiftable therein alternately to close one and open the other of said respectively cooperating valve means simultaneously, each of said valve means being so formed as to produce analogous opening cross-section and material flow characteristics at any degree of opening thereof, and a control element for controlling the axial movement of said plunger in said housing;

said plunger having a first opening communicating its hollow interior with that portion of said plunger chamber which is in communication with said material feed duct, and a second opening communicating its hollow interior with said return valve means whereby said hollow interior defines a passage through which all return flow occurs.

2. The injection element according to claim 1, wherein said plunger is approximately spindle-shaped and is formed with an external annular piston constituting said control element, portions of said injection and return valve means being removably mounted in said injection element.

3. The injection element according to claim 2, wherein said first opening of said plunger is radially directed and said second opening is axially directed.

4. The injection element according to claim 2, wherein said first and second openings in said plunger are both radially directed, and wherein the opposite end faces of said plunger are each of identical construction.

5. The injection element according to claim 1, wherein said return valve means in said housing is axially adjustable therein.

6. The injection element according to claim 1, wherein the return valve means on said plunger comprises an annular insert member threadedly received in said plunger.

7. The injection element according to claim 1, wherein said injection valve means in said housing is removable.

8. The injection element according to claim 1, wherein said plunger is formed of two approximately spindle-shaped hollow portions joined at and forming said annular piston.

* * * * *